April 28, 1953   C. E. LICHARZ   2,636,916
ELECTRODE FOR GALVANIC CELLS
Filed Sept. 14, 1949   2 SHEETS—SHEET 1

April 28, 1953 C. E. LICHARZ 2,636,916
ELECTRODE FOR GALVANIC CELLS

Filed Sept. 14, 1949 2 SHEETS—SHEET 2

Patented Apr. 28, 1953

2,636,916

UNITED STATES PATENT OFFICE 2,636,916

ELECTRODE FOR GALVANIC CELLS

Carl Elmar Licharz, Stockholm, Sweden, assignor to International Company for Industrial Exploitation S. A.

Application September 14, 1949, Serial No. 115,602
In Sweden September 14, 1948

11 Claims. (Cl. 136—49)

The present invention relates to an electrode for galvanic cells, particularly for accumulators, and a process for the manufacture thereof.

It is an object of this invention to provide an electrode in which the ratio between the weight of the electrode and the active material contained in the electrode and thus the amount of current supplied by the electrode is particularly favorable.

It is another object of this invention to increase the capacity of the electrodes for absorbing the electrolyte so that the total amount of the electrolyte required for the conversion of the active material can be taken in by the electrodes without a dropping of the terminal voltage.

It is a further object of the present invention to provide an electrode having a maximal conductivity between the individual parts thereof so that the inner resistances of the electrode are reduced to a minimum.

It is a still further object of the present invention to provide an electrode which can resist mechanical shocks.

The present invention accomplishes all these objects and an electrode according to this present invention has a high capacity and small volume and weight. The effects obtained with the electrodes according to the present invention correspond almost to the theoretical limits and the energy losses occurring in the electrodes according to the present invention are very small. The electrode according to the present invention allows of supplying current at the theoretical terminal voltage during the whole discharge, a dropping of the terminal voltage being avoided.

The mentioned results are substantially accomplished by providing, according to the present invention, an electrode for galvanic cells, particularly accumulators, consisting in the main of a material, the fundamental layer of which includes loosely packed, non-conductive fibres indifferent to the reactions taking place in the cell and forming a band, the surface of which substantially equals the sum of the surfaces of the individual fibres, a metal covering the fundamental layer and rendering said fibres electrically conductive, said metal being indifferent to the chemical reactions taking place in the cell and being resistant against the electrolyte, and a layer of active electrode material carried by the metal.

In a preferred embodiment of the present invention the frame and the intermediate strips of the electrode and the intermediate layers arranged between the strips consist of the same material and form a unitary whole, the frame and the strips differing from the intermediate layers arranged between them by a higher degree of compression.

In another embodiment of the present invention the frame and intermediate strips of the electrodes consist of a synthetic material resistant against the electrolyte and forming a carrier for the inserted metal layers which protrude to the surface at a number of places sufficient for the carrying of the current. In this case as well as in the one referred to hereabove, preferably the density of the fibres in the band and the thickness of the layer of the active electrode material are fitted to each other so that the electrode can absorb so much of the electrolyte as is needed for the total conversion of the active material without a dropping of the terminal voltage.

In a preferred embodiment of the present invention the fibres consist of glass. However, silicone fibres, i. e. fibres consisting of organic silicon compounds have been found to be suitable. In most cases fibres having a minimum diameter, particularly below $2 \times 10^{-3}$ mm. are to be preferred. Particularly favorable results have been obtained, e. g. with glass fibres having a diameter of $0.5 \times 10^{-3}$ mm., the production of which is the subject matter of my copending application Serial No. 115,603 filed September 14, 1949, for Process and Device for Treating Threads and Fibers. The length of the fibres is preferably at least equal to half the distance between the intermediate strips and it has been found particularly preferable to choose a length of the fibres so that they approximately equal the distance between the intermediate strips.

The use of the fibres as a carrier for the active electrode material results in a very considerable increase of the effective surfaces. This is seen at once if it is borne in mind that one cubic centimeter of glass (approximately 2.7 grams) transformed to fibres having a diameter of $0.5 \times 10^{-3}$ mm. have a total fibre length of 5,000 km. The surface of these fibres is 15 sq. meters i. e. the surface is increased to approximately 25,000 fold. The thickness of the layer of the active electrode material deposited on the carrier consisting according to the invention of fibres, can be held very small. For instance, with fibres having a diameter of $0.5 \times 10^{-3}$ mm., a thickness of the active electrode material amounting to $0.75 \times 10^{-3}$ mm. has been found to be preferable. The total volume of this layer amounts to 6 cubic centimeters and its weight in case of a lead electrode amounts to approximately 75 grams. The surface of this layer is about 20 sq. meters. It is possible to increase the thickness of the layer of the active material beyond the given value; in doing so an increase in weight has to be put up with, but the life of the electrode is very considerably lengthened. The increase in surface, which is very considerable in any case, results in the elimination of otherwise disturbing by-reactions such as the sulphitization of the lead electrodes preventing a closing of the pores. For this reason the electrodes according to the present invention are much more stable than all electrodes known hitherto and this effect is most marked if the thickness of the layer of active electrode material is made as small as possible. The mentioned layer thickness of $0.75 \times 10^{-3}$ mm. represents an optimum in many respects; but an increase of the layer thickness to 10 times this value has to be considered if a corresponding lengthening of the life of the electrode is required.

It has been suggested to use fibres as carriers for the active electrode material. These suggestions, however, have not met with success since the fibres were twisted to threads and fabrics were made from the threads, the active electrode material being deposited into the meshes of the fabric. By the twisting of the fibres and the weaving of the fabric from the threads more than 90% of the active surface of the fibre material is lost. In contradistinction thereto, according to the present invention, loose fibres are combined to a band without twisting and/or weaving. Such a band has a surface which is substantially equal to the sum of the surfaces of the individual fibres.

In order to render, in the electrode according to the present invention, the conduction of the current as perfect as possible, each individual fibre has to be conductive. This is accomplished in electrodes according to the present invention by providing each individual fibre with a covering layer consisting of a metal which does not take part in the chemical reactions in the galvanic cell and is resistant against the electrolyte. In consequence thereof the conduction of current in the electrode is so perfect that the inner resistance of the electrode is a minimum.

The loose packing of the band of fibres renders it possible that the electrode according to the present invention can absorb the whole amount of electrolyte required for the total conversion of the active material without a dropping of the terminal voltage. By this, in contradistinction to the known electrodes, difficulties are overcome which might be caused by an incomplete transport of the electrolyte.

A further considerable saving in weight is obtained in the electrodes according to the present invention by making the frame and the intermediate strips by subjecting to a pressing operation the fibre band provided with the active electrode material. Thus the loose structure is no longer present in the frame and the strips, these parts of the electrode serving on the whole for the conduction of current and the stabilization of the electrode but not for the storing and discharging of energy.

In another embodiment of the present invention which is also very advantageous and in which the frame and the strips consist of a synthetic material resistant to the electrolyte and serving as a carrier for metal layers provided in a number of places on the surface which is sufficient for the current conduction, it is a particular advantage that the electrode distinguishes itself by a high resistance against mechanical stresses. It has a flexibility which has not been reached hitherto in any known electrode for accumulators.

The present invention has a particular importance for lead accumulators. However, it can be used also for Edison accumulators and other alkaline accumulators and for other galvanic cells. In electrodes designed for lead accumulators it has been found preferable to form the metal layer covering the fibers, of cadmium, antimony, or tin, or an alloy of two or all of these metals. In electrodes for an Edison accumulator or other alkaline accumulator the metal layer covering the fibres consists of metals having a high electrical conductivity and being resistant against the alkaline electrolyte, such as copper, silver, or alloys of these metals. The covering metal layers may be deposited electrolytically or in vacuo from metal vapor. The electrolytical deposition involves the advantage of a much lower energy consumption than the depositing in vacuo. In order to render possible an electrolytical depositing the non-conductive fibres have to be activated first which can be done, for instance, by a preliminary treatment with stannous chloride. The depositing of the covering metal layer is particularly facilitated if fibres having a roughened surface are applied.

The layer of active material is deposited on the covering metal layer. In the negative electrode of a lead accumulator this can be done, for instance, by depositing lead electrolytically on the fibres provided with a covering layer. With positive electrodes of lead accumulators it has been found preferable to deposit on the covering metal layer first a layer of lead which in turn carries the layer of brown lead oxide. This can be done for instance by transforming the surface of the lead layer into brown lead oxide or by spraying under pressure fine particles of brown lead oxide on the heated layer of lead.

In many cases it has been found preferable to provide the electrode according to the present invention with an outer protective layer of a suitable colloid or a stiffening substance such as silica gel or a colloidal derivative of cellulose.

In a process for manufacturing an electrode according to the present invention first a loose band is made from the fibre material which is then provided with the covering metal layer by an electrolytical process or by depositing the metal in vacuo. Then the layer of active electrode material is deposited. As mentioned above, this is done for instance in the negative electrodes of lead accumulators by electrolytically depositing a layer of lead. The so obtained fibre band carrying the active electrode material is then either formed by a suitable pressing operation into electrodes or can be introduced into a frame made of synthetic material with metal inserts for the conduction and the withdrawal of the current. In the first mentioned pressing operation of the fibre bands carrying the active electrode material, binders may be added securing a firmer cohesion of the plates.

In pressing the metallized fibre bands, it has been found preferable to apply protective layers preventing a sticking of the fibre bands to the heated pressing tools. These protective layers may consist for instance, of bands of paper or parchment covered by wax or colophony.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
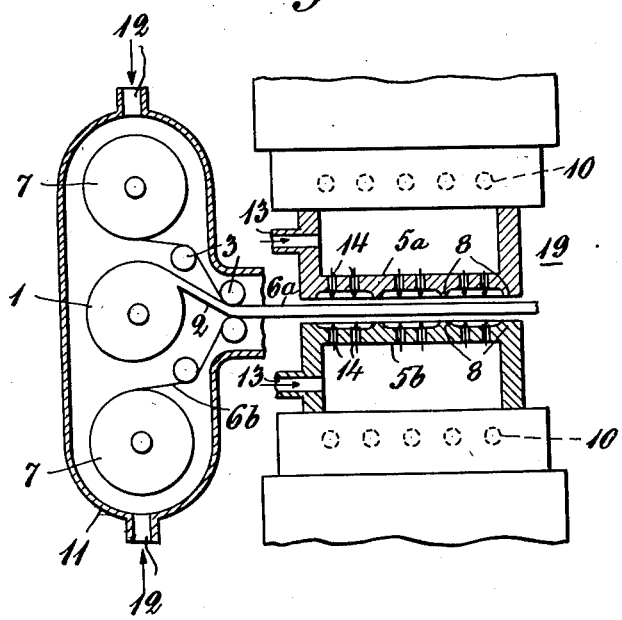
Fig. 1 is a diagrammatic side elevation partly in section of a device for manufacturing an electrode according to the present invention.

Referring now to the drawings and first to Fig. 1, 11 is a casing in which a reel 1 for the fibre band 2 is provided together with two other reels 7, one above and one below the reel 1, which carry protective bands 6a and 6b consisting of paper or parchment covered by wax or colophony. The fibre band is metallized as discussed above and then provided with a layer of active electrode material before it is wound on the reel 1. Over sliding and guiding rollers 3 the bands are guided parallel to each other to a press 19 which is provided with tools 5a and 5b similar to each other. The tools 5a and 5b have each a system of projecting parts or ledges 8 between which are arranged intermediate fields which are recessed so that they do not exert any pressing operation on the band. The pressing tools 5a and 5b are each provided with a heating device 10 indicated diagrammtically in the drawing and have a hollow space provided with an inlet pipe 13 for a protective gas. The outlet openings 14 for the protective gas are arranged in the areas between the projecting parts or ledges 8. The protective gas flows through the outlet openings during the pressing operation and prevents the admission of oxygen to the fibre bands during pressing. Nitrogen for instance, can be used as the protective gas. However, particularly preferable has been found reducing gases such as hydrogen or mixtures of nitrogen and hydrogen which reduce the remnants of oxygen present in the fibre band. The protective bands 6a and 6b which are provided with fine perforations for the admission of the protective gas prevent a sticking of the fibre band to the projecting parts or ledges 8 of the pressing tools.

Figure 2:
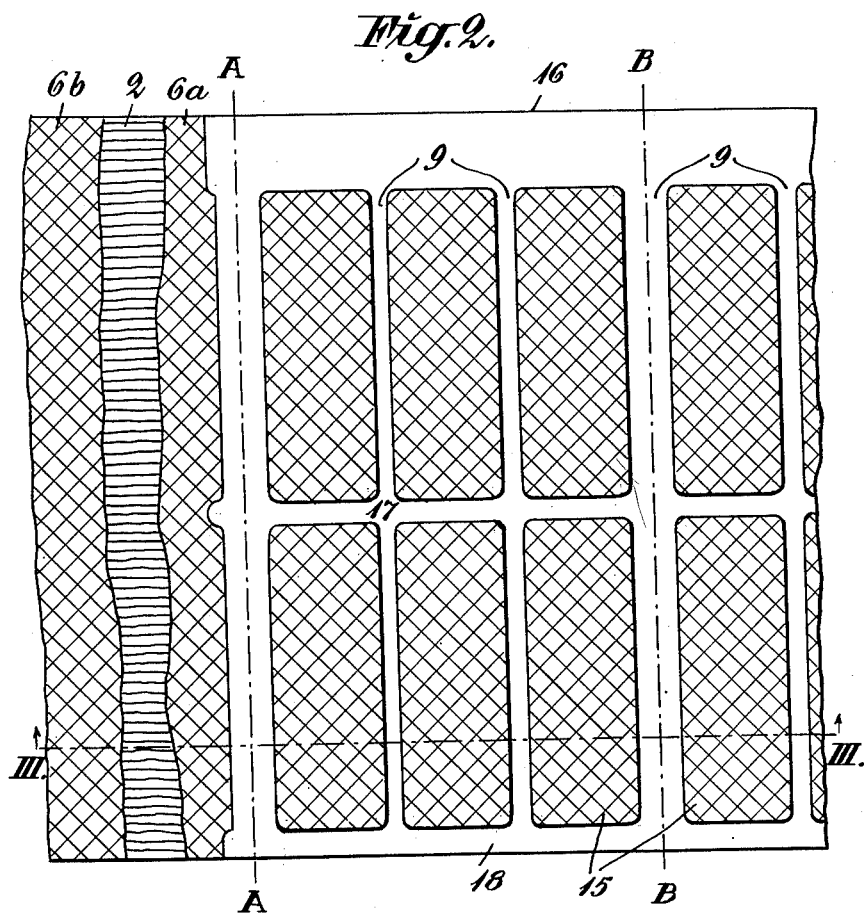
Fig. 2 shows part of an electrode band made by the device shown in Fig. 1.
Figure 3:
Fig. 3 is a cross-section of the band along the line III—III of Fig. 2.

Referring now to Figs. 2 and 3, a section of the electrode plate is shown between the section lines A—A and B—B which coheres on the right-hand side with the electrode plate formed during the preceding pressing operation and not yet separated.

In the left-hand part of Fig. 2, the two protective bands 6a and 6b and the fibre band 2 lying between them, are shown. By the pressing operation a frame has been formed which consists of intermediate strips 9 arranged at right angles to the longitudinal direction of the band and of strips 16, 17, 18 running in the longitudinal direction of the band. The uppermost strip 16 is designed to serve as a carrying member for the electrode. In the intermediate areas 15 the loose structure of the fibre band is extant without any change.

In order to prevent any oxidation during storing preferably the finished plate is impregnated immediately after the pressing operation with a suitable gel-like colloid which may have the property of being dissolved in the electrolyte when the plate is immersed in it without an injurious effect on the electrolyte being incurred.

In an accumulator or a primary cell either only one electrode e. g. the negative electrode, or both a negative and a positive electrode can be designed according to the present invention. As intermediate layers between the electrodes, suitable insulating layers, e. g. of non-metallized glass fibres or fabrics woven from such fibres may be used.

As mentioned above, the present invention enables the production of cells the electrolyte of which is practically completely inside the electrode. Thus the free liquid in the accumulator is dispensed with which involves a great advantage, for instance, in accumulators designed for ships and aircraft.

The table below gives some examples of the ratio between the thickness of the active layer and the thickness of the acid layer required for the chemical conversion of the active layer for each individual fibre, the values relating to a lead accumulator electrode according to the invention. In all cases the diameter of the fibre in the carrier layer is $0.5 \times 10^{-3}$ mm.

| Thickness of the Active Lead Layer, mm. | Density of the Acid, g./cu. cm. | Thickness of the Acid Layer, mm. |
|---|---|---|
| $0.75 \times 10^{-3}$ | 1.4 | $1.85 \times 10^{-3}$ |
| $0.5 \times 10^{-3}$ | 1.4 | $1.34 \times 10^{-3}$ |
| $0.25 \times 10^{-3}$ | 1.4 | $0.8 \times 10^{-3}$ |
| $0.25 \times 10^{-3}$ | 1.5 | $0.67 \times 10^{-3}$ |
| $0.25 \times 10^{-3}$ | 1.6 | $0.56 \times 10^{-3}$ |

It will be understood that each of the elements described above, or two or more together, may also find a useful application in other types of electrodes for galvanic cells differing from the types described above.

While I have illustrated and described the invention as embodied in electrodes for accumulators, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning of and range of equivalence of the following claims.

What I claim as new and desire to secure by Letters Patent is:

1. An electrode for galvanic cells comprising in combination, a fundamental layer consisting of non-conductive fibres indifferent to the reactions taking place in the cell and forming a loosely packed band the surface of which substantially equals the sum of the surfaces of the individual fibres; a metal individually covering each of said fibres in said fundamental layer and rendering said fibres electrically conductive, said metal being indifferent to the chemical reactions taking place in the cell and being resistant to the electrolyte; and a coating of active electrode material substantially completely covering each of said individual metal-covered fibers.

2. An electrode for galvanic cells comprising in combination, a frame; and an intermediate layer arranged in said frame and consisting of a fundamental layer consisting of non-conductive fibres indifferent to the reactions taking place in the cell and forming a loosely packed band the surface of which substantially equals the sum of the surfaces of the individual fibres, a metal individually covering each of said fibres in said fundamental layer and rendering said fibres electrically conductive, said metal being indifferent to the chemical reactions taking place in the cell, and being resistant to the electrolyte, and a coating of active electrode material substantially completely covering each of said individual metal-covered fibers, said frame consisting of the same material as said intermediate layer and forming a unit therewith, said frame differing from said intermediate layer by a higher degree of compression.

3. An electrode for galvanic cells, comprising in combination, a frame; intermediate strips joining, respectively, opposite sides of said frame; intermediate layers arranged in said frame between said frame and said intermediate strips, respectively, and each consisting of a fundamental layer consisting of non-conductive fibres indifferent to the reactions taking place in the cell and forming a loosely packed band the surface of which substantially equals the sum of the surfaces of the individual fibres, a metal individually covering each of said fibres in said fundamental layer and rendering said fibres electrically conductive, said metal being indifferent to the chemical reactions taking place in the cell and being resistant to the electrolyte, and a coating of active electrode material substantially completely covering each of said individual metal-covered fibres, said frame and said intermediate strips consisting of the same material as said intermediate layers and forming a unit therewith, said frame and said intermediate strips differing from said intermediate layers by a higher degree of compression.

4. An electrode for galvanic cells, comprising in combination, a frame consisting of a synthetic material resistant to the electrolyte; and a layer inserted in said frame and consisting of a fundamental layer consisting of non-conductive fibers indifferent to the reactions taking place in the cell and forming a loosely packed band the surface of which substantially equals the sum of the surfaces of the individual fibers, a metal individually covering each of said fibers in said fundamental layer and rendering said fibers electrically conductive, said metal being indifferent to the chemical reactions taking place in the cell and being resistant to the electrolyte, and a coating of active electrode material substantially completely covering each of said individual metal covered fibers.

5. An electrode for galvanic cells, comprising in combination, a frame; and intermediate strips joining, respectively, opposite sides of said frame, both said frame and said intermediate strips consisting of a synthetic material resistant to the electrolyte; and layers inserted in said frame between said frame and said intermediate strips, separately, and each including a fundamental layer consisting of non-conductive fibers indifferent to the reactions taking place in the cell and forming a loosely packed band the surface of which substantially equals the sum of the surfaces of the individual fibers, a metal individually covering each of said fibers in said fundamental layer and rendering said fibers electrically conductive, said metal being indifferent to the chemical reactions taking place in the cell and being resistant to the electrolyte, and a coating of active electrode material substantially completely covering each of said individual metal covered fibers.

6. An electrode for galvanic cells, comprising in combination, a fundamental layer consisting of non-conductive fibers indifferent to the reactions taking place in the cell and forming a loosely packed band the surface of which substantially equals the sum of the surfaces of the individual fibers; a metal individually covering each of said fibers in said fundamental layer and rendering said fibers electrically conductive, said metal being indifferent to the chemical reactions taking place in the cell and being resistant to the electrolyte; a coating of active electrode material substantially completely covering each of said individual metal covered fibers; and a terminal in electrically conductive connection with said loosely packed band of metal covered, active material coated fibers.

7. An electrode for galvanic cells, comprising in combination, a fundamental layer consisting of non-conductive glass fibers indifferent to the reactions taking place in the cell and forming a loosely packed band the surface of which substantially equals the sum of the surfaces of the individual fibers; a metal selected from the group consisting of copper, silver and alloys of copper and silver individually covering each of said fibers in said fundamental layer and rendering said fibers electrically conductive, said metal being indifferent to the chemical reactions taking place in the cell and being resistant to the electrolyte; and a coating of active electrode material substantially completely covering each of said individual metal covered fibers.

8. An electrode for galvanic cells, comprising in combination, a frame consisting of a synthetic material resistant to the electrolyte; and a layer inserted in said frame and consisting of a fundamental layer consisting of non-conductive glass fibers indifferent to the reactions taking place in the cell and forming a loosely packed band the surface of which substantially equals the sum of the surfaces of the individual fibers, a metal selected from the group consisting of copper, silver and alloys of copper and silver individually covering each of said fibers in said fundamental layer and rendering said fibers electrically conductive, said metal being indifferent to the chemical reactions taking place in the cell and being resistant to the electrolyte, and a coating of active electrode material substantially completely covering each of said individual metal covered fibers.

9. An electrode for galvanic cells, comprising in combination, a fundamental layer consisting of non-conductive glass fibers having a diameter less than $2 \times 10^{-3}$ mm., indifferent to the reactions taking place in the cell and forming a loosely packed band the surface of which substantially equals the sum of the surfaces of the individual fibers; a metal selected from the group consisting of copper, silver and alloys of copper and silver individually covering each of said fibers in said fundamental layer and rendering said fibers electrically conductive, said metal being indifferent to the chemical reactions taking place in the cell and being resistant to the electrolyte; and a coating of active electrode material substantially completely covering each of said individual metal covered fibers.

10. An electrode for galvanic cells, comprising in combination, a frame consisting of a synthetic material resistant to the electrolyte; and a layer inserted in said frame and consisting of a fundamental layer consisting of non-conductive glass fibers having a diameter less than $2 \times 10^{-3}$ mm., indifferent to the reactions taking place in the cell and forming a loosely packed band the surface of which substantially equals the sum of the surfaces of the individual fibers, a metal selected from the group consisting of copper, silver and alloys of copper and silver individually covering each of said fibers in said fundamental layer and rendering said fibers electrically conductive, said metal being indifferent to the chemical reactions taking place in the cell and being resistant to the electrolyte, and a coating of active electrode material substantially completely covering each of said individual metal covered fibers.

11. An electrode for galvanic cells, comprising in combination, a frame; intermediate strips joining, respectively, opposite sides of said frame, both said frame and said intermediate strips consisting of a synthetic material resistant to the electrolyte; and layers inserted in said frame between said frame and said intermediate strips, separately, and each including a fundamental layer consisting of non-conductive glass fibers indifferent to the reactions taking place in the cell and forming a loosely packed band the surface of which substantially equals the sum of the surfaces of the individual fibers, the length of said fibers being at least equal to one half the distance between said intermediate strips, a metal individually covering each of said fibers in said fundamental layer and rendering said fibers electrically conductive, said metal being indifferent to the chemical reactions taking place in the cell and being resistant to the electrolyte, and a coating of active electrode material substantially completely covering each of said individual metal covered fibers.

CARL ELMAR LICHARZ.

References Cited in the file of this patent

UNITED STATES PATENTS

| Number | Name | Date |
|---|---|---|
| 296,164 | Haid | Apr. 1, 1884 |
| 657,638 | Bowker | Sept. 11, 1900 |
| 1,008,852 | Morrison | Nov. 14, 1911 |
| 1,175,954 | Hubbell | Mar. 21, 1916 |
| 1,280,908 | Wales et al. | Oct. 8, 1918 |
| 1,547,408 | Buisson | July 28, 1925 |
| 1,649,579 | Edison | Nov. 15, 1927 |
| 1,688,399 | Reinhardt | Oct. 23, 1928 |
| 1,718,139 | Grimditch | June 18, 1929 |
| 1,789,443 | Levin | Jan. 20, 1931 |
| 2,048,347 | Martus et al. | July 21, 1936 |
| 2,104,018 | Brennan | Jan. 4, 1938 |
| 2,277,763 | Keen | Mar. 31, 1942 |
| 2,304,073 | Brennan | Dec. 8, 1942 |
| 2,361,378 | Brennan | Oct. 31, 1944 |
| 2,428,470 | Powers | Oct. 7, 1947 |
| 2,432,657 | Colbert et al. | Dec. 16, 1947 |
| 2,479,603 | Chubb et al. | Aug. 23, 1949 |

FOREIGN PATENTS

| Number | Country | Date |
|---|---|---|
| 46,090 | Germany | Jan. 2, 1889 |
| 491,796 | Germany | Feb. 19, 1930 |
| 4,079 | Great Britain | of 1882 |
| 13,381 | Great Britain | of 1892 |
| 76,872 | Sweden | Jan. 29, 1930 |